Figure 1:
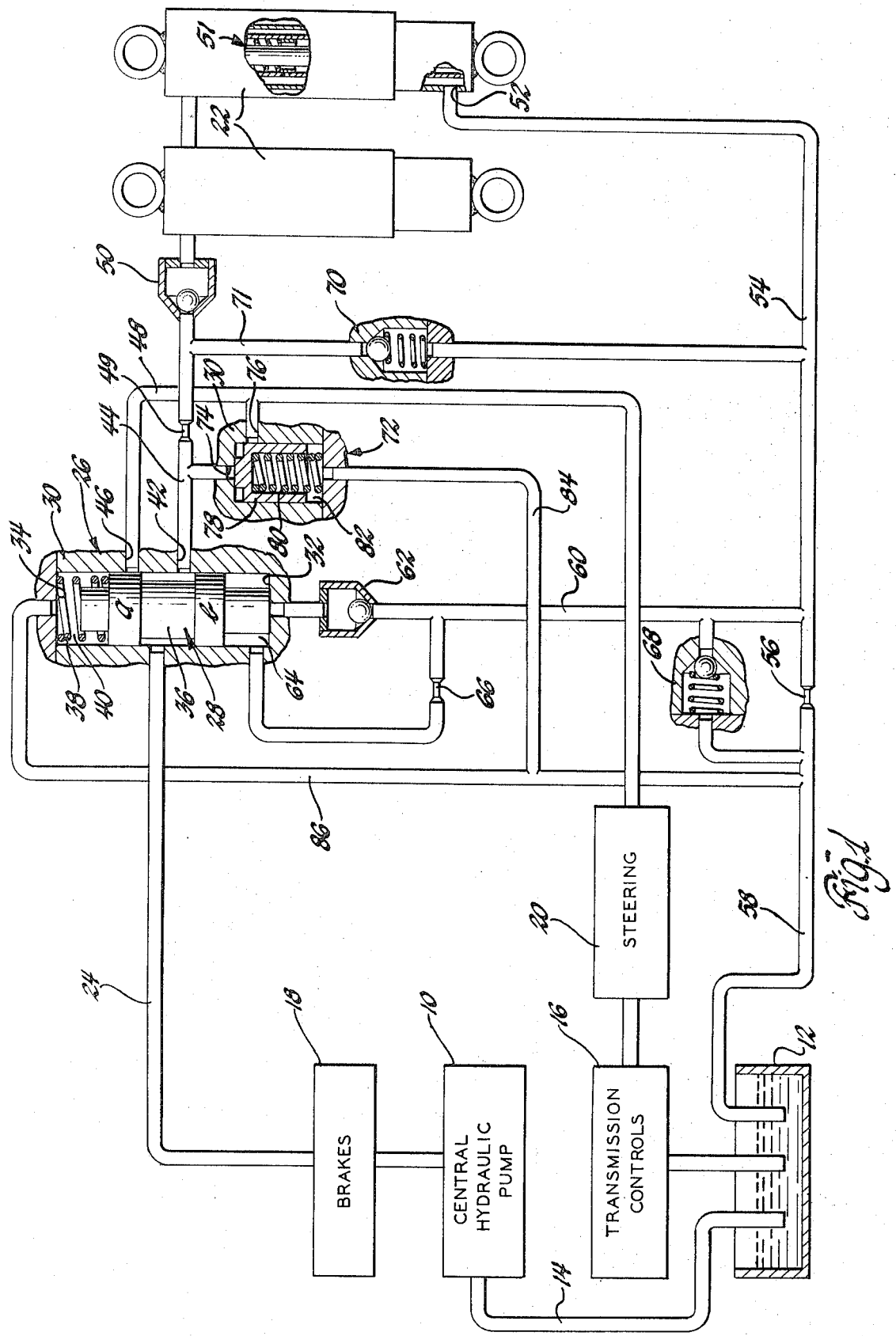

United States Patent [19]
Whelan

[11] 3,835,949
[45] Sept. 17, 1974

[54] HYDRAULIC LEVELING CONTROL SYSTEM

[75] Inventor: James E. Whelan, Dayton, Ohio

[73] Assignee: General Motors Corporation, Detroit, Mich.

[22] Filed: Oct. 19, 1973

[21] Appl. No.: 407,897

[52] U.S. Cl............................... 180/41, 280/124 F
[51] Int. Cl............................................. B60g 17/00
[58] Field of Search ........ 180/41; 280/DIG. 1, 79.2, 280/6 R, 6 H

[56] References Cited
UNITED STATES PATENTS
2,895,744   7/1959   Jackson............................ 280/124 F
2,927,801   3/1960   Jackson............................ 280/124 F Primary Examiner—David Schonberg
Assistant Examiner—Terrance L. Siemens
Attorney, Agent, or Firm—Charles R. White

[57] ABSTRACT

Control system including hydraulically operated vehicle levelers in which there is intermittent back pressure from the levelers on the supply pump and in which there is a control valve responsive to height signals from the levelers to direct pressure fluid to the levelers when the levelers are below level height and which directs fluid to a circuit bypassing the levelers when the levelers are above level height to thereby reduce pressure and volume requirements from the supply pump.

4 Claims, 2 Drawing Figures

HYDRAULIC LEVELING CONTROL SYSTEM

This invention relates to vehicle leveling and more particularly to new and improved hydraulic control systems for extensible and contractable hydraulic levelers in which there is intermittent increase in back pressure on the hydraulic pump of this system only when supplying charging pressure to the levelers.

The hydraulic control system of this invention automatically maintains a height of a vehicle for all load conditions up to maximum load. The system employs a hydraulic pump which is required to intermittently pump high pressure oil required by the hydraulically operated levelers only when the levelers are below height so that overall energy requirements needed to operate the pump are reduced and pump service life is substantially increased. The system basically involves a control valve which responds to height signals from the levelers to direct fluid to the levelers when leveler charge pressure is needed to increase vehicle height, or to a circuit bypassing the levelers when the vehicle is at or above level height.

In one embodiment of this invention there is a new and improved control system incorporating a control valve that is automatically actuated to direct the feed of pressure fluid to first or second circuits. In a leveler charge mode this control valve feeds the first circuit which includes the vehicle levelers and any other hydraulically operated components which may be optionally employed. This circuit has a back pressure valve which automatically operates to increase pump pressure to provide the increased pressure needed to charge the levelers. The control valve is tripped by the back pressure developed by the fluid exhaust from the levelers when a predetermined vehicle standing height is obtained so that flow is directed into the second circuit.

In a leveler bypass mode of operation, the control valve feeds the second circuit circumventing the levelers and back pressure valve and conducts fluid flow to the sump via the power steering and transmission controls if employed. In this latter mode of operation a substantially lower pressure is required thereby unloading the pump to increase pump service life. Under these operating conditions there is little or no fluid exhaust from the levelers and when the levelers are finally below a predetermined height, spring means moves the control valve to the leveler charge load of operation to start another cycle.

In one embodiment of this invention there is a new and improved control system incorporating a control valve that is automatically actuated to direct the feed of pressure fluid to a first circuit or second circuit. In a leveler charge mode the control valve charges the first circuit which includes the vehicle levelers and other optionally employed hydraulically operated components such as the power steering and transmission controls. This circuit has a back pressure valve that increases the pump pressure to provide the increased pressure needed to charge the levelers. The control valve is tripped by the back pressure developed by the fluid exhaust from the levelers when a predetermined vehicle standing height is obtained and flow is directed into the second circuit. The second circuit bypasses the levelers and back pressure valve and conducts fluid flow to the sump via the power steering and transmission controls if employed. In this latter mode of operation a substantially lower operating pressure is employed thereby unloading the pump and increasing pump service life. Subsequent to the end of the fluid exhaust from the levelers and when the levelers are below predetermined height spring means moves the control valve to the leveler charge mode to start another cycle.

In a second embodiment of the invention a flow divider valve is employed in the circuit leading from the control valve to the levelers so that the leveler load fixes the pump pressure when the levelers demand charge pressure. The flow divider valve provides a high volume flow to the sump via the steering gear, transmission controls and other components if employed and a low volume flow to the levelers. When the control valve is tripped by a signal pressure from the levelers on attainment of a predetermined height the leveler bypass circuit is charged with pressure to thereby unload the pump. With both of these embodiments there is a minimization of full hydraulic load pressure on the supply pump of the hydraulic system.

It is a feature, object and advantage of this invention to provide a new and improved hydraulic control circuit for vehicle hydraulic leveling featuring control means for unloading a fluid pump when the levelers are at level height and do not require recharge pressure.

Another feature, object and advantage of this invention is to provide a new and improved hydraulic control circuit for a vehicle in which a control valve automatically directs flow from a hydraulic pump to a circuit for the hydraulic levelers when the levelers are below height, thereby loading the pump and which automatically directs fluid to a circuit bypassing the levelers when the levelers are above height, thereby unloading the pump reducing energy requirements to operate the pump and increasing pump service life.

Another feature, advantage and object of this invention is to provide a new and improved hydraulic control system for hydraulic operation of vehicle height control levelers in which the supply pump is required to recharge the levelers only periodically as they leak down and contract to a below height level.

Figure 2:
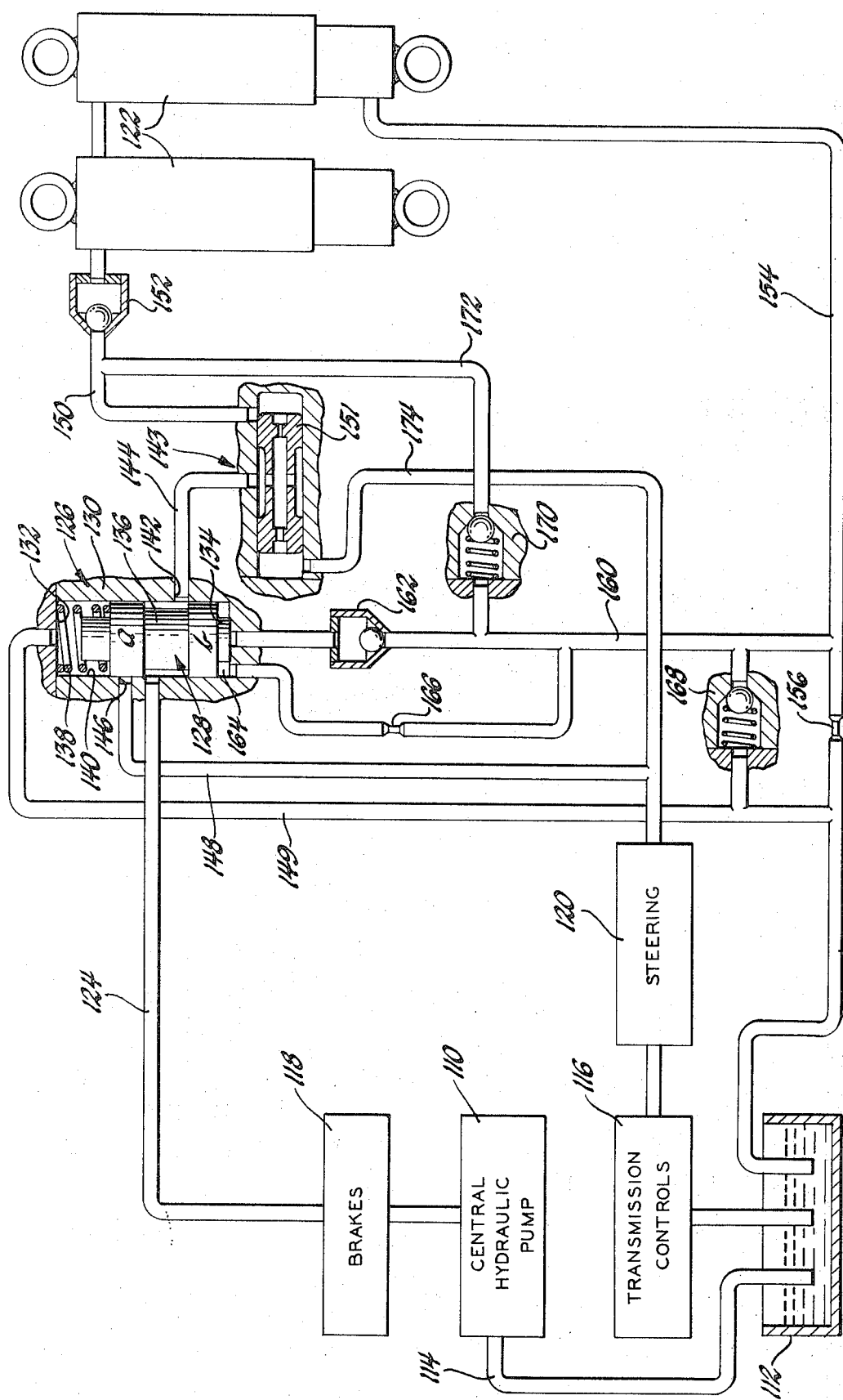

These and other features, objects and advantages of this invention will become more apparent from the following detailed description and drawings in which:

FIG. 1 is a diagrammatic view of one embodiment of the control system of this invention; and FIG. 2 is a diagrammatic view of a second embodiment of the control system of this invention.

As shown diagrammatically in FIG. 1, there is a hydraulic pump 10 hydraulically connected to sump 12 by line 14 and driven by a power source such as a vehicle engine to pump fluid from the sump to automatic transmission controls 16, power brake module 18, steering gear 20 and load levelers 22. Pressure fluid for the brakes, steering gear and load levelers is supplied through a line 24 that leads from the pump to the brake module 18 and from the brake module to a control valve 26. The control valve 26 has a valve element 28 mounted for shifting movement in a valve body 30 between a first position in engagement with a stop 32 and a second position in engagement with a stop 34 to control the feed of pressure fluid to the levelers and the steering gear as will be further explained below.

The valve element 28 is formed with two spaced lands a and b and a reduced diameter intermediate portion 36. The valve element 28 is biased under predetermined operating conditions by a spring 38, disposed in a spring pocket 40 to the first position so that the pump can supply pressure fluid through the intermediate portion 36 of the valve element to a feed port 42 and a connected leveler supply line 44. In this first position of valve element 28, land a blocks a feed port 46 which is connected to a line 48 that leads directly to the steering gear 20, transmission controls 16 and sump 12.

Supply line 44 is hydraulically connected to the levelers and has a flow restriction 49 to reduce the flow to the levelers and also has a one-way check valve 50 interposed between the restriction and the levelers to block flow from the levelers to the control valve 26.

The levelers 22 are hydraulically connected in series and are operatively connected between sprung and unsprung masses of the vehicle and operate to keep the vehicle body at a substantially constant height at all times for all vehicle load conditions up to maximum load. The leveler illustrated on the extreme right has an exhaust valve assembly 51 which exhausts oil from the levelers through port 52 only when the levelers are extended above a predetermined height. Valve assembly 51 is illustrated and described in detail in my copending application 335,475 filed Feb. 26, 1973 for Hydraulic Leveler with Exhaust Only Height Control Valve which is hereby incorporated by reference into this description. As diagrammatically illustrated in the drawings the exhaust port 52 of the levelers 22 is connected to a return line 54 having a flow control restriction 56 therein, which leads into exhaust line 58 connected to sump 12.

The control valve 26 is supplied with an above level height signal from levelers 22 fed through line 54, a connecting branch line 60 and one-way check valve 62 to a pressure chamber 64 formed in control valve 26 at one end of the valve element 28 behind land b. A flow control restriction 66 is disposed in parallel with the one-way check valve 62 to control the discharge of fluid from chamber 64 under operating conditions later described.

A relief valve 68 is disposed between lines 60 and 58 in parallel with restriction 56 in the line 54. Valve 68 cooperates with restriction 56 to permit a predetermined pressure buildup in the lines 54 and 60 and chamber 64 to shift the valve element 28 toward stop 32 when the vehicle body is above level height and the levelers are exhausting oil. A second relief valve 70 is provided in line 71 connecting the leveler feed line 44 and the leveler exhaust line 54 downstream of the levelers 22 to provide pressure relief in the event of excessive pressure buildup in the leveler supply line 44.

A back pressure valve 72 is hydraulically connected between leveler supply line 44 and steering gear supply line 48 and is operative to effect an increase in fluid pressure when the control valve is directing fluid to the levelers 22. This back pressure valve has an inlet port 74 connected to supply line 44 between restriction 49 and control valve 26 and an outlet port 76 connected to supply line 48. The back pressure valve further has a valve element 78 mounted in the valve body 30 urged by a spring 80 in a chamber 82 to an upper position in which ports 74 and 76 are closed and flow from the supply line 44 to the steering gear feed line 48 is blocked. When the valve is urged downwardly by the buildup of sufficient pressure in line 44, the back pressure valve element 78 will be displaced downwardly so that ports 74 and 76 are opened and the steering gear is fed by oil through the back pressure valve 72 and line 48 for steering gear operation. The spring chambers of back pressure valve 72 and control valve 26 are connected to exhaust line 58 by lines 84 and 86 respectively.

In operation, when the engine starts, the oil supplied by pump 10 flows through the brake module to the control valve. With the control valve element in the leveler charge mode or startup position, oil is fed through the intermediate portion of the control valve between lands a and b into leveler supply line 44. The restriction 49 causes the major part of the pump flow to pass to the closed constant back pressure valve. Under these conditions the pump output increases to provide increased pressure to open the back pressure valve so that line 44 is supplied with high pressure oil for the levelers as well as oil for the steering gear and transmission controls. Valve 70 insures that the pump provides increased pressure for the levelers to raise a fully loaded vehicle which pressure requirement is greater than the minimum steering back pressure.

With restrictor 49 in line 44 a minor part of the pump flow passes through the check valve 50 into the levelers to recharge these units and raise the vehicle to a predetermined standing height. When the vehicle reaches the proper height, the height control valve in the levelers opens allowing oil to pass into line 54. Orifice 56 and relief valve 68 cause the pressure in the conduit 54 to rise to overcome the bias of the spring 38 to move the control valve element 28 against the stop 34. In this shifted position, land b of control valve element 28 blocks port 42 and flow to the leveler supply line 44 and allows the oil to bypass the constant back pressure valve 70 by flowing directly from port 46 into line 48 to the steering gear. Since the levelers are not being fed with oil under these conditions, the pressure requirements from the pump are reduced to that of the steering gear so the pump 10 is effectively unloaded.

During operation of the vehicle under these conditions each rebound ride motion will extend the levelers 22 and open the exhaust valve therein to allow a small amount of oil to pass through the lines 54 and 60 to urge the valve element 28 against the stop 32. Each compression ride motion closes the exhaust valve in the levelers 22 and small quantities of oil in chamber 64 will be forced by the spring biased valve element 28 through the orifice 66, orifice 56 and line 58 to the sump 12. As this action continues the vehicle slowly lowers a nominal amount, for example 1/8 to 1/4 of an inch, so that the oil from the levelers on the rebound motion does not replenish the oil forced through orifices 66 and 56 to the sump during the compression motion. When the pressure in chamber 64 drops to a sufficiently low pressure, spring 38 moves the control valve element 28 to the leveler charge mode position illustrated in the drawing and back pressure valve 72 is activated so that pressure of pump 10 is increased to raise the vehicle to a level which allows the oil to again exhaust from the levelers to start another cycle of operation.

The second embodiment of this invention illustrated in FIG. 2 is similar to the FIG. 1 embodiment and includes a hydraulic pump 110 operatively connected to sump 112 by a line 114 and driven by a vehicle engine to pump fluid from the sump to automatic transmission controls 116, power brake module 118, steering gear 120 and levelers 122. Pressure fluid for the brakes, steering gear and levelers is supplied through a line 124 that leads from the pump to the brake module 118 and from the brake module to a control valve 126. The control valve 126 is identical to the control valve construction in the embodiment of FIG. 1 and has a valve element 128 mounted for shifting movement in a valve body 130 between a first position in engagement with a stop 132 and a second position in engagement with a stop 134 to selectively control the feed of pressure to the levelers or to a circuit bypassing the levelers.

The valve element 128 is formed with spaced lands a and b and a reduced diameter intermediate portion 136. The valve element 128 is biased under certain operating conditions by a spring 138 disposed in a spring pocket 140 to the first position so that the pump can supply pressure fluid through the intermediate portion 136 of the valve element to a feed port 142 connected to a flow divider valve 143 by supply line 144. In this first position of the valve element 128, land a blocks the feed port 146 which is connected to a line 148 which is hydraulically connected to the steering gear 120. As in the first embodiment the spring pocket 140 is connected to exhaust line 149.

The flow divider valve 143 has a valve element 151 with restrictions to provide low volume flow to the levelers 122 through line 150 and check valve 152 and high volume flow to the steering gear later described. The levelers 122 are the same as described in the FIG. 1 embodiment and are operatively connected between sprung and unsprung masses of the vehicle to keep the vehicle body at a substantially constant height at all times for all vehicle load conditions up to maximum load. As pointed out in connection with FIG. 1, the leveler on the right has an exhaust only height control valve which exhausts oil only when the vehicle body is at or above level height. As diagrammatically illustrated in the FIG. 2, the exhausts of the levelers 122 are connected to a return line 154 having a flow control restriction 156 therein which leads into an exhaust line 158 connected to sump 112.

The control valve is supplied with a height signal fed through line 154, a connecting branch line 160, and a one-way check valve 162 to a pressure chamber 164 formed in the control valve 126 at one end of the valve element 128 behind land b. A flow control restriction 166 is disposed in parallel to the one-way check valve 162 to control the discharge of fluid from chamber 164 under operating conditions which will be later described.

A relief valve 168 is disposed between lines 160 and exhaust 158 in parallel with restriction 156. The valve 168 cooperates with the restriction 156 to permit a predetermined pressure buildup in the lines 154, 160 and chamber 164 to shift the valve element 28 toward stop 132 under certain operating conditions. A second relief valve 170 is provided in a line 172 connecting the leveler feed line 150 downstream of the flow divider valve to line 160 to provide pressure relief in the event of pressure buildup in the leveler supply line.

The flow divider valve 143 is hydraulically connected by line 174 to the steering gear supply line 148 and is operative to effect a division of flow from the control valve 126 to the levelers 122 and to the steering gear 120. For example, ten percent of the flow will be directed to the levelers 122 and ninety percent of the flow will be directed to the steering gear.

Assuming that the controls are in the startup position and with the engine started, oil will flow through the brake module to the control valve through the line 124 and from the control valve into the flow divider. The oil exits from the flow divider 143 with the major part of the pump flow passing through the conduit 174, through the steering gear 120, and through transmission controls 116 to the sump. A minor part of the pump flow passes through the line 150 and the check valve 152 into the leveler units 122 interposed between the sprung and unsprung masses of the vehicle. With this system vehicle load determines the pressure required of pump 110 with heavier loads requiring proportionally larger pressures to charge the levelers.

When the vehicle reaches the proper height, the height control valve within levelers 122 opens, allowing oil to pass through the line 154. The orifice 156 and relief valve 168 cause the pressure in lines 154 and 160 and chamber 164 to rise. The force exerted on land b of the valve element 128 overcomes the bias of spring 138 to move the control valve element 128 against stop 132. In the shifted position, the control valve element blocks the flow to line 144 and allows the oil to bypass the flow divider and flow directly from the control valve through line 148 to the steering gear 120, transmission 116 and sump 112.

With the supply to the levelers blocked, each rebound motion of the vehicle will allow a small amount of oil to pass through conduit 154 to urge the control valve element 128 toward or against stop 132. Each compression ride motion closes the leveler valve and oil will be forced by spring 138 through orifice 166, orifice 156 and line 158 to the sump. As this action continues, the vehicle slowly lowers a nominal amount, such as 1/8 to 1/4 of an inch, so that the oil passing from the levelers on the rebound motion is not sufficient to replenish the oil forced through orifices 166 and 156 to sump during the compression motion. When the pressure in chamber 164 drops to a low pressure level, spring 138 moves the control valve to the leveler charge mode or startup position and the vehicle is raised to a level height which allows oil to again exhaust from the levelers to shift the control valve against the stop 132 and start another cycle.

The control circuits of FIGS. 1 and 2 both provide intermittent oil flow to the hydraulic levelers and this flow only occurs when the control valve 26 or 126 is shifted to the position illustrated in the drawings. Since higher fluid pressure is required by the levelers the pump load is increased to produce that pressure. However when the levelers have extended to a predetermined height, the control valve is triggered so that the leveler feed is bypassed and pressure requirements are substantially reduced.

While preferred embodiments of the invention have been shown and described in detail to illustrate the invention, various changes and modifications may be made without departing from the scope of the invention set forth in the following claims.

I claim:

1. A central hydraulic control system for a vehicle comprising a sump containing a hydraulic fluid, hydraulic pump means operatively connected to said sump, extendible and contractable hydraulically operated leveler means operatively connected between sprung and unsprung masses of said vehicle for controlling the height of said vehicle, said leveler means having fluid inlet and fluid outlet means, a control valve hydraulically connected to said pump means, first hydraulic circuit means connecting said control valve to said fluid inlet means of said leveler means, second hydraulic circuit means bypassing said leveler means for connecting said control valve to said sump, a hydraulic passage operatively connecting said fluid outlet means of said leveler means to said sump, a signal passage connecting said hydraulic passage to said control valve, means in said hydraulic passage to permit a pressure buildup in said signal passage when said leveler means exhaust fluid into said hydraulic passage, and valve element means for said control valve movable in response to a buildup of pressure in said signal passage to a position to hydraulically connect said pump means to said second circuit means and to block the supply of hydraulic fluid to said first circuit means, and actuator means for moving said valve element means in response to a drop in pressure in said signal passage to a position to hydraulically connect said pump means to said first circuit means and to block the supply of hydraulic fluid to said second circuit means.

2. A central hydraulic control system for a vehicle comprising a sump containing a hydraulic fluid, hydraulic pump means operatively connected to said sump, extendible and contractable hydraulically operated leveler means operatively connected between sprung and unsprung masses of said vehicle for controlling the height of said vehicle, said leveler means having fluid inlet and fluid outlet means, a control valve hydraulically connected to said pump means, first hydraulic circuit means for conducting fluid to said fluid inlet of said leveler means, a flow divider valve in said first hydraulic circuit means to divide the flow of fluid between said leveler means and said sump, second hydraulic circuit means bypassing said leveler means and connecting said control valve to said sump, a hydraulic passage operatively connecting said fluid outlet of said leveler means to said sump, a signal passage connecting said hydraulic passage to said control valve, means in said hydraulic passage to permit a pressure buildup in said signal passage and said control valve when said leveler means exhaust fluid into said hydraulic passage, and valve element means for said control valve movable in response to a buildup of pressure in said control valve to a position to hydraulically connect said pump means to said second circuit means and to block the supply of hydraulic fluid to said first circuit means, and actuator means for moving said valve element means in response to a drop in pressure in said control valve to a position to hydraulically connect said pump means to a position to hydraulically connect said pump means to said first circuit means and to block the supply of hydraulic fluid to said second circuit means.

3. A hydraulic control system for vehicles comprising extendible hydraulically operated leveling unit means operatively connected between sprung and unsprung masses of a vehicle, hydraulic pump means for supplying pressure fluid for said system, sump means containing a supply of hydraulic fluid, control valve means operatively connected to said hydraulic pump means, first hydraulic circuit means having first conduit means hydraulically connecting said control valve to said leveling unit means and second conduit means hydraulically connecting said control valve to said sump, second hydraulic circuit means bypassing said leveling unit means and hydraulically connecting said control valve means to said sump, said control valve having a valve element shiftable between a first position in which said hydraulic pump means pump fluid to said first circuit means and a second position in which said hydraulic pump means pumps fluid to said second circuit means to bypass said first circuit means, fluid conducting means operatively connecting said leveling unit means to said control valve to provide a hydraulic force on said valve element to move said valve element to said first position when said leveling unit means extends beyond a predetermined height, and motor means for moving said valve element to said second position when said leveling unit means is below said predetermined height.

4. A hydraulic control system for a vehicle comprising a sump containing a hydraulic fluid, hydraulic pump means operatively connected to said sump, separate first and second hydraulically operated fluid unit means for controlling different operations of said vehicle, said first fluid unit means being extendible and contractable leveler means operatively connected between sprung and unsprung masses of said vehicle for controlling the height of said vehicle, said second fluid unit means being a power steering gear unit, said leveler means having a fluid inlet and a fluid outlet, a control valve hydraulically connected to said pump means, first hydraulic circuit means connecting said control valve to said fluid inlet of said leveler means and to said power steering gear unit, back pressure valve means operatively connected in said first circuit means for increasing the pressure output of said pump means, flow restriction means in said first circuit means to reduce the fluid flow to said levelers and to allow an increased flow to said power steering gear unit, second hydraulic circuit means bypassing said leveler means connecting said control valve to said second hydraulically operated fluid unit means, a hydraulic passage operatively connecting said fluid outlet of said leveler means to said sump, a signal passage connecting said hydraulic passage to said control valve, means in said hydraulic passage to permit a pressure buildup in said signal passage when said leveler means exhaust fluid into said hydraulic passage, and valve element means for said control valve movable in response to a buildup of pressure in said signal passage to a position to hydraulically connect said pump means to said second circuit means and to block the supply of hydraulic fluid to said first circuit means, and actuator means for moving said valve element means in response to a drop in pressure in said signal passage to a position to hydraulically connect said pump means to said first circuit means and to block the supply of hydraulic fluid to said second circuit means so that said leveler means and said power steering gear unit are supplied with pressure fluid.

* * * * *